US012708880B2

(12) United States Patent
Miyabe et al.

(10) Patent No.: US 12,708,880 B2
(45) Date of Patent: Aug. 18, 2026

(54) COMPOSITE SEMIPERMEABLE MEMBRANE, SPIRAL MEMBRANE ELEMENT, WATER TREATMENT SYSTEM, AND WATER TREATMENT METHOD

(71) Applicant: NITTO DENKO CORPORATION, Ibaraki (JP)

(72) Inventors: Tomotsugu Miyabe, Osaka (JP); Masashi Echizen, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 567 days.

(21) Appl. No.: 17/980,979

(22) Filed: Nov. 4, 2022

(65) Prior Publication Data

US 2023/0144222 A1 May 11, 2023

(30) Foreign Application Priority Data

Nov. 5, 2021 (JP) ................................ 2021-180897

(51) Int. Cl.
*B01D 69/12* (2006.01)
*B01D 61/02* (2006.01)
(Continued)

(52) U.S. Cl.
CPC ....... *B01D 69/1216* (2022.08); *B01D 61/026* (2022.08); *B01D 63/103* (2013.01); *B01D 69/02* (2013.01); *B01D 69/1251* (2022.08); *B01D 71/381* (2022.08); *B01D 71/56* (2013.01); *B01D 71/58* (2013.01); *B01D 71/66* (2013.01); *B01D 71/68* (2013.01); *C02F 1/441* (2013.01);
(Continued)

(58) Field of Classification Search
None
See application file for complete search history.

(56) References Cited

U.S. PATENT DOCUMENTS 6,413,425 B1 * 7/2002 Hachisuka ............ B01D 71/56 210/500.34
2002/0108900 A1 8/2002 Hirose et al.
(Continued)

FOREIGN PATENT DOCUMENTS

CN 105026022 A 11/2015
CN 209493453 U 10/2019
(Continued)

OTHER PUBLICATIONS

Extended European Search Report issued for European Patent Application No. 22205297.9, dated Mar. 30, 2023, 9 pages.
(Continued)

*Primary Examiner* — Krishnan S Menon
(74) *Attorney, Agent, or Firm* — HSML P.C.

(57) ABSTRACT

A composite semipermeable membrane 12 of the present invention includes a porous support membrane 12*a* and a skin layer 12*b* supported by the porous support membrane 12*a*. The membrane surface of the composite semipermeable membrane 12 has an elastic modulus of 250 MPa or more and 500 MPa or less as calculated by force curve measurement using AFM in water. A spiral membrane element 20 of the present invention includes the composite semipermeable membrane 12 of the present invention. A water treatment system 100 of the present invention includes the spiral membrane element 20 of the present invention.

5 Claims, 6 Drawing Sheets

(51) Int. Cl.

| | |
|---|---|
| ***B01D 63/10*** | (2006.01) |
| ***B01D 69/02*** | (2006.01) |
| ***B01D 71/38*** | (2006.01) |
| ***B01D 71/56*** | (2006.01) |
| ***B01D 71/58*** | (2006.01) |
| ***B01D 71/66*** | (2006.01) |
| ***B01D 71/68*** | (2006.01) |
| ***C02F 1/44*** | (2023.01) |

(52) U.S. Cl.

CPC ...... *B01D 2311/08* (2013.01); *B01D 2311/14* (2013.01); *B01D 2317/022* (2013.01); *B01D 2317/08* (2013.01); *B01D 2323/40* (2013.01); *B01D 2325/24* (2013.01)

(56) References Cited

U.S. PATENT DOCUMENTS

| | | | |
|---|---|---|---|
| 2016/0008773 | A1 | 1/2016 | Yoneda et al. |
| 2016/0279581 | A1 | 9/2016 | Echizen et al. |
| 2017/0007969 | A1 | 1/2017 | Nishiyama et al. |
| 2018/0001274 | A1 | 1/2018 | Matsui et al. |

FOREIGN PATENT DOCUMENTS

| | | | | |
|---|---|---|---|---|
| EP | 2614881 | A1 | 7/2013 | |
| EP | 3199225 | A1 | 8/2017 | |
| EP | 3357560 | A1 | 8/2018 | |
| EP | 3417928 | A1 | 12/2018 | |
| EP | 3513869 | A1 | 7/2019 | |
| EP | 4074411 | A1 | 10/2022 | |
| JP | H1128466 | A | 2/1999 | |
| JP | 2016140777 | A | 8/2016 | |
| JP | 2020044457 | A | 3/2020 | |
| JP | 2021090953 | A | 6/2021 | |
| WO | WO-2015065498 | A1 * | 5/2015 | ............ B01D 71/48 |
| WO | 2019117121 | A1 | 6/2019 | |

OTHER PUBLICATIONS

First Office Action issued for Chinese Patent Application No. 202211370782.9, dated Apr. 13, 2024, 15 pages including English machine translation.

Notice of Reasons for Refusal issued for Japanese Patent Application No. 2021-180897, 6 pages including English machine translation.

Examination Report issued for Indian Patent Application No. 202214063098, Date of Dispatch: Sep. 1, 2025, 7 pages.

Office Action issued for Taiwanese Patent Application No. 111142252, dated Jan. 20, 2026, 16 pages including English translation.

* cited by examiner

COMPOSITE SEMIPERMEABLE MEMBRANE, SPIRAL MEMBRANE ELEMENT, WATER TREATMENT SYSTEM, AND WATER TREATMENT METHOD

BACKGROUND OF THE INVENTION

1. Field of the Invention

The present invention relates to a composite semipermeable membrane, a spiral membrane element, a water treatment system, and a water treatment method.

2. Description of Related Art

In recent years, a zero liquid discharge (ZLD) system has been attracting a great deal of attention. "ZLD" is a technical idea for reducing liquid waste discharged to the natural environment such as rivers and seas to zero. In a ZLD system, wastewater is concentrated using a membrane separation technique, and then, moisture is evaporated from the concentrated wastewater to produce solid waste. A very large amount of energy is consumed during the final stage for producing the solid waste. The membrane separation technique enables energy consumption saving by greatly reducing the amount of wastewater to be treated in the final stage.

A typical ZLD system includes a plurality of reverse osmosis membrane units that are connected in series, as described in JP 2020-44457 A. Wastewater is concentrated in a stepwise manner as it passes through the plurality of reverse osmosis membrane units.

SUMMARY OF THE INVENTION

In a water treatment system, membrane replacement is recommended when the salt rejection rate falls below a predetermined level. A long membrane life is preferable because the cost required for water treatment is reduced as the membrane life increases. The membrane life is affected by various factors such as the intended use of the water treatment system, the composition of raw water, the temperature of the raw water, and the operating pressure. Under these circumstances, the inventors of the present invention became aware of the fact that, in a certain type of water treatment system such as a ZLD system, there are cases where the membrane life expires earlier than expected. Then, they discovered that this is caused by frequently repeated running and stopping of the system.

For example, in a well-known seawater desalination system, seawater is supplied to the seawater desalination system at a constant flow rate and fresh water is produced at a constant flow rate. In contrast, in a certain type of water treatment system such as a ZLD system, the flow rate of wastewater (raw water) is not always constant. One of the reasons why the flow rate of wastewater is not constant is that the flow rate of wastewater changes depending on the operational status of a plant. The ZLD system is provided with a buffer tank for stabilizing the flow rate of wastewater, and the ZLD system is automatically stopped when the level of water contained in the buffer tank falls below a predetermined level.

Frequent switching between running and stopping of the system causes the composite semipermeable membranes to be subjected to and released from water pressure repeatedly. This damages the composite semipermeable membranes, thereby accelerating the deterioration of the rejection performance of these composite semipermeable membranes. Damage to the composite semipermeable membranes can be reduced by, for example, using permeate-side flow path materials with a high knitting density. However, use of the permeate-side flow path materials with a high knitting density reduces the permeate flux. Increasing the operating pressure in order to compensate for the reduced permeate flux results in an increase in power consumed by a pump.

It is an object of the present invention to provide a composite semipermeable membrane suitable for a system that involves frequently repeated switching between ON and OFF states, such as a ZLD system. The present invention also provides a spiral membrane element that uses the composite semipermeable membrane, a water treatment system that uses the spiral membrane element, and a water treatment method that uses the spiral membrane element.

The present invention provides a composite semipermeable membrane including:

- a porous support membrane; and
- a skin layer supported by the porous support membrane, wherein
- a membrane surface of the composite semipermeable membrane has an elastic modulus of 250 MPa or more and 500 MPa or less as calculated by force curve measurement using AFM in water.

Viewed from another aspect, the present invention provides a spiral membrane element including the above-described composite semipermeable membrane according to the present invention.

Viewed from still another aspect, the present invention provides a water treatment system including the above-described spiral membrane element according to the present invention.

Viewed from still another aspect, the present invention provides a water treatment method including:

- concentrating wastewater in a low-pressure RO membrane module;
- further concentrating, in a medium-pressure RO membrane module, the wastewater that has been concentrated in the low-pressure RO membrane module; and
- further concentrating, in a high-pressure RO membrane module, the wastewater that has been concentrated in the medium-pressure RO membrane module, wherein
- the medium-pressure RO membrane module includes the above-described spiral membrane element according to the present invention,
- a feed pressure to the low-pressure RO membrane module is lower than a feed pressure to the medium-pressure RO membrane module,
- the feed pressure to the medium-pressure RO membrane module is lower than a feed pressure to the high-pressure RO membrane module, and
- the feed pressure to the medium-pressure RO membrane module is 2.0 MPa or more and 4.0 MPa or less.

The present invention can provide a composite semipermeable membrane suitable for a system that involves frequently repeated switching between ON and OFF states, such as a ZLD system.

DETAILED DESCRIPTION OF THE INVENTION

Hereinafter, embodiments of the present invention will be described with reference to the drawings. It is to be noted, however, that the present invention is not limited to the following embodiments.

Embodiment 1

Figure 1:
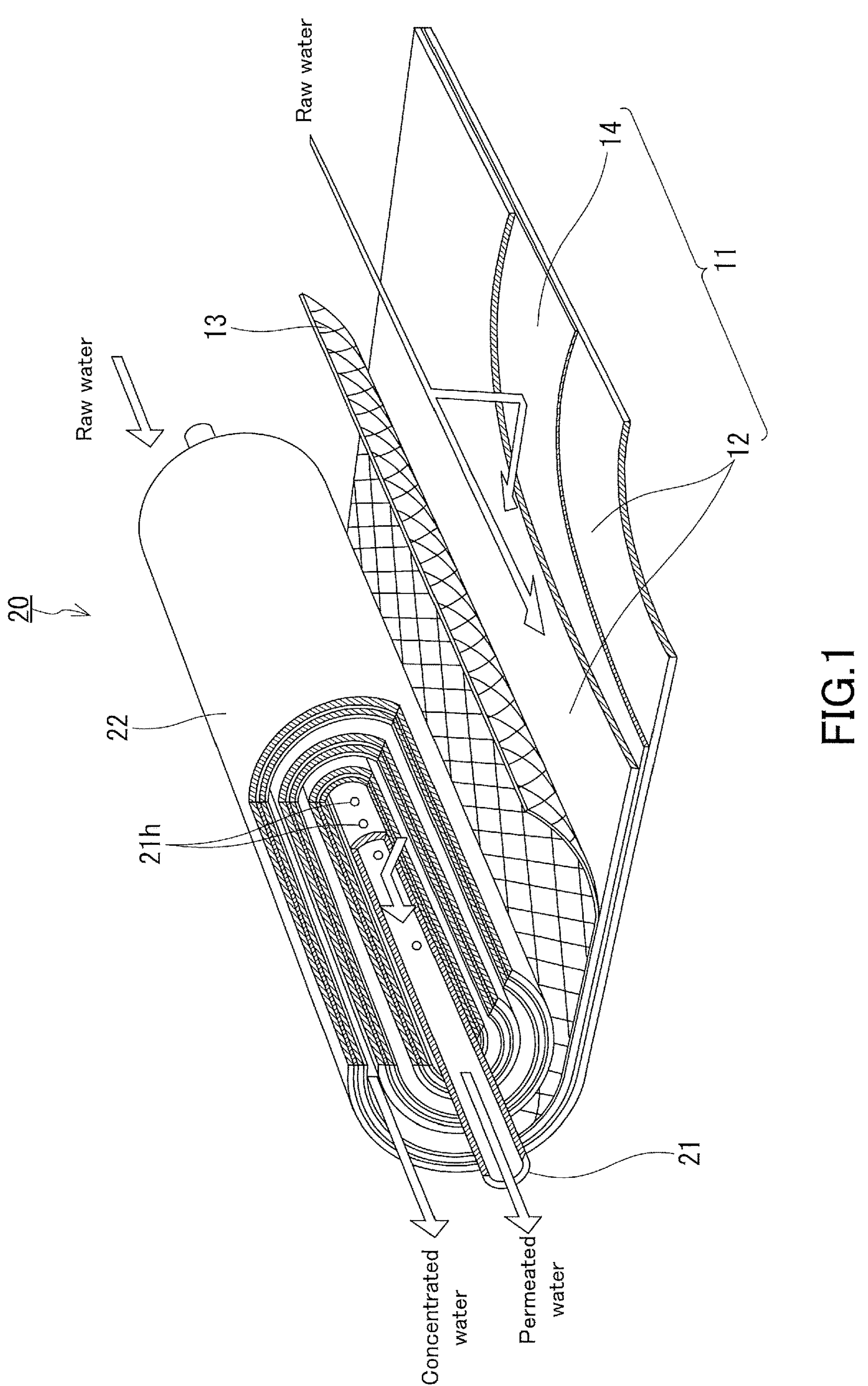
FIG. 1 is a developed perspective view of a spiral membrane element according to Embodiment 1.

FIG. 1 shows a spiral membrane element 20 according to Embodiment 1 of the present invention. The spiral membrane element 20 includes a water collection tube 21 and a laminate 22. The laminate 22 is provided around the water collection tube 21. Raw water flow paths and permeate water flow paths are formed inside the laminate 22. The water collection tube 21 extends through the center of the laminate 22.

Raw water is supplied from one end face of the laminate 22 into the spiral membrane element 20 and flows parallel to the longitudinal direction of the water collection tube 21 through the raw water flow paths. The raw water is filtered through the spiral membrane element 20, whereby concentrate water and permeate water are produced. The permeate water is led to the outside through the water collection tube 21. The concentrate water is discharged to the outside of the spiral membrane element 20 from the other end face of the laminate 22.

Examples of raw water to be treated by (filtered through) the spiral membrane element 20 include wastewater discharged from plants and the like. Examples of the wastewater include coking wastewater, coal chemical industry wastewater, and produced water. Coking wastewater, coal chemical industry wastewater, and produced water may contain an aromatic compound at a concentration approximately in the range from a few ppm to several hundred ppm. Aromatic compounds are known to cause chemical degradation of composite semipermeable membranes. Accordingly, it is not easy to treat wastewater containing an aromatic compound. However, the composite semipermeable membrane according to the present embodiment can be used over a long period of time even when used for treating wastewater containing an aromatic compound. It is to be noted that the raw water is not limited to wastewater.

A composite semipermeable membrane 12, a raw water-side flow path material 13, and a permeate-side flow path material 14 are used to constitute the laminate 22. End faces of the composite semipermeable membrane 12 constitute the end faces of the laminate 22. More specifically, the laminate 22 is constituted by a plurality of composite semipermeable membranes 12, a plurality of raw water-side flow path materials 13, and a plurality of permeate-side flow path materials 14.

The raw water-side flow path material 13 may be a member having a net-like structure and made of a resin material such as polyester, polyethylene, and polypropylene. The permeate-side flow path material 14 may be a knitted material made of a resin material such as polyester, polyethylene, and polypropylene. The permeate-side flow path material 14 is typically a tricot knitted material.

The plurality of composite semipermeable membranes 12 are stacked one on top of another, sealed at three sides to form a bag-like structure, and wrapped around the water collection tube 21. The raw water-side flow path materials 13 are each interposed between the composite semipermeable membranes 12 so as to be located outside the bag-like structure. The raw water-side flow path materials 13 secure spaces that serve as the raw water flow paths between the composite semipermeable membranes 12. The permeate-side flow path materials 14 are each interposed between the composite semipermeable membranes 12 so as to be located inside the bag-like structure. The permeate-side flow path materials 14 secure spaces that serve as the permeate water flow paths between the composite semipermeable membranes 12. A membrane leaf 11 is constituted by a pair of composite semipermeable membranes 12 and a permeate-side flow path material 14. The open ends of membrane leaves 11 are connected to the water collection tube 21 such that the permeate water flow paths are in communication with the water collection tube 21.

The water collection tube 21 plays a role of collecting permeate water that has passed through the respective composite semipermeable membranes 12 and leading the permeate water to the outside of the spiral membrane element 20. The water collection tube 21 has a plurality of through holes 21*h* provided at predetermined intervals along its longitudinal direction. Permeate water flows into the water collection tube 21 via these through holes 21*h*.

Figure 2:
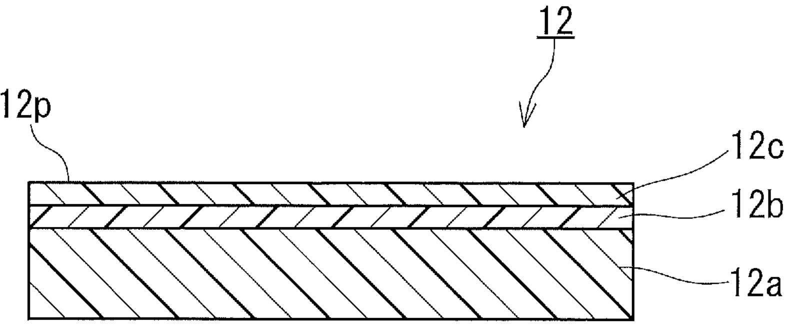
FIG. 2 is a cross-sectional view of a composite semipermeable membrane used in the spiral membrane element shown in FIG. 1.

FIG. 2 is a cross-sectional view of the composite semipermeable membrane 12 used in the spiral membrane element 20 shown in FIG. 1. The composite semipermeable membrane 12 includes a porous support membrane 12*a*, a skin layer 12*b*, and a coating 12*c*. The porous support membrane 12*a*, the skin layer 12*b*, and the coating 12*c* are laminated in this order. The skin layer 12*b* and the coating 12*c* are supported by the porous support membrane 12*a*. The skin layer 12*b* is on the porous support membrane 12*a*. The coating 12*c* is on the skin layer 12*b*. The coating 12*c* covers the skin layer 12*b*. More specifically, the coating 12*c* is in direct contact with the skin layer 12*b*.

Figure 3:
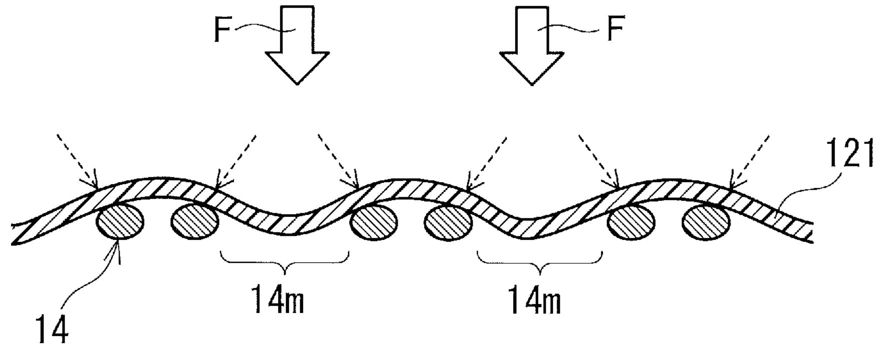
FIG. 3 is a cross-sectional view illustrating a mechanism by which a composite semipermeable membrane is damaged.

FIG. 3 is a cross-sectional view illustrating a mechanism by which a composite semipermeable membrane is damaged. When raw water is introduced into the spiral membrane element to cause water pressure F to be applied to a composite semipermeable membrane 121, parts of the composite semipermeable membrane 121 sink into grooves 14*m* of a permeate-side flow path material 14. The remaining parts of the composite semipermeable membrane 121 are pressed against the permeate-side flow path material 14, whereby loads indicated by dashed-line arrows are applied locally. The groove 14*m* is, for example, a portion between wales. When the introduction of raw water is stopped, the composite semipermeable membrane 121 is released from the water pressure F. Also, the loads indicated by the dashed-line arrows are alleviated almost completely. When the introduction of raw water is started again, water pressure F is applied to the composite semipermeable membrane 121 again. When the composite semipermeable membrane 121 is repeatedly subjected to application of water pressure F and release from the water pressure F, the composite semipermeable membrane 121 will have defects mainly at portions that are repeatedly pressed against the permeate-side flow path material 14. In the composite semipermeable membrane 121, defects are liable to occur in the skin layer, which is thin. This accelerates a decrease in the salt rejection rate of the composite semipermeable membrane 121.

It is expected that, when the composite semipermeable membrane 121 is rigid enough to resist against the water pressure F, the composite semipermeable membrane 121 is less susceptible to damages caused by the ON-OFF switching of application of the water pressure F. However, contrary to the expectation, providing the composite semipermeable membrane 121 with a proper degree of flexibility is effective in reducing damages caused by the ON-OFF switching of application of the water pressure F.

More specifically, a membrane surface 12*p* of the composite semipermeable membrane 12 of the present embodiment has an elastic modulus of 250 MPa or more and 500 MPa or less. The elastic modulus of the membrane surface 12*p* is calculated by force curve measurement using an atomic force microscope (AFM) in water. When the elastic modulus of the membrane surface 12*p* is in such a range, the composite semipermeable membrane 12 is unlikely to be damaged even when it is subjected to repeated ON-OFF switching of water pressure application. As a result, the life of the spiral membrane element 20 is extended.

The method for performing the force curve measurement using AFM in water is as described in the "Examples" section below.

In the composite semipermeable membrane 12, the coating 12*c* contains a polymer. The coating 12*c* allows easy adjustment of the elastic modulus of the membrane surface 12*p*.

The type of polymer contained in the coating 12*c* differs from the type of polymer contained in the skin layer 12*b*. The skin layer 12*b* is made of polyamide, for example. The polymer contained in the coating 12*c* includes, for example, at least one selected from the group consisting of polyvinyl alcohol, betaine polymer, and polyoxazoline. These polymers are hydrophilic polymers (polymers having a hydrophilic group). These polymers allow easy adjustment of the elastic modulus of the membrane surface 12*p*.

The thickness of the coating 12*c* is not limited to particular values. The thickness of the coating 12*c* is, for example, from 10 to 1000 nm. The thickness of the coating 12*c* can be determined in the following manner. Specifically, the thickness of the coating 12*c* is measured at a plurality of randomly selected points (e.g., 10 points) on a cross-section of the composite semipermeable membrane 12. The average value of the thus-obtained measured values can be regarded as the thickness of the coating 12*c*. The thickness measurement is carried out using a SEM or a TEM.

The presence of the coating 12*c* can be confirmed using a scanning electron microscope or a transmission electron microscope. The composition analysis of the polymer contained in the coating 12*c* can be carried out by Fourier-transform infrared spectroscopy (FT-IR), X-ray photoelectron spectroscopy (XPS), or time-of-flight secondary ion mass spectrometry (TOF-SIMS).

The elastic modulus of the membrane surface 12*p* is determined by various factors. Specific examples of the factors include the material of the skin layer 12*b*, the thickness of the skin layer 12*b*, the surface roughness (Ra) of the skin layer 12*b*, the material of the coating 12*c*, the thickness of the coating 12*c*, and the temperature at which the skin layer 12*b* is formed. The elastic modulus of the membrane surface 12*p* can be improved by performing a heat treatment of the skin layer 12*b* after forming the skin layer 12*b*. The heat treatment is performed by, for example, exposing the membrane to hot water of about 50° C. The elastic modulus of the membrane surface 12*p* tends to be low when the material of the coating 12*c* is soft or highly hydrophilic. Also, increasing the thickness of the coating 12*c* tends to decrease the elastic modulus of the membrane surface 12*p*. However, increasing the thickness of the coating 12*c* too much results in a decrease in the permeate flux ($m^3/m^2$/day).

In the spiral membrane element 20, the permeate-side flow path materials 14, which are tricot knitted materials, have a knitting density of 31 to 60 wales and 34 to 52 courses. The composite semipermeable membranes 12 are in contact with the permeate-side flow path materials 14. In the present embodiment, the knitting density of the permeate-side flow path materials 14 is adjusted to a suitable value in consideration of the composite semipermeable membranes 12. Owing to the combination of the effect brought about by adjusting the elastic modulus of the membrane surfaces of the composite semipermeable membranes 12 and the effect brought about by adjusting the knitting density of the permeate-side flow path materials 14, the durability against the ON-OFF switching of water pressure application can be further improved while ensuring a desired permeate flux.

The term "wale" refers to a vertical column of loops in a knitted material. The term "course" refers to a crosswise row of loops in a knitted material. The density of a knitted material (knitting density) is expressed as the number of wales per inch (wale density) and the number of courses per inch (course density). Alternatively, the knitting density may be expressed as (wale density)×(course density).

The degree of damages to the composite semipermeable membranes 12 can be known based on a decrease in the salt rejection rate after performing an ON-OFF test. The salt rejection rate can be defined as, for example, an NaCl rejection rate. Specifically, first, an aqueous NaCl solution with a predetermined concentration is supplied to the spiral membrane element 20 at a predetermined feed pressure, and the NaCl rejection rate is measured. Next, the supply of the aqueous NaCl solution is stopped. Thereafter, the supply of the aqueous NaCl solution is started again. This cycle is repeated to a total of n times (e.g., 7000 times). The feed pressure is, for example, 2.0 MPa or more and 4.0 MPa or less. The degree of damages to the composite semipermeable membrane 12 can be known based on the difference between the NaCl rejection rate at the first cycle and the NaCl rejection rate at the n-th cycle.

The NaCl rejection rate can be measured in a manner that complies with Japanese Industrial Standards JIS K 3805 (1990). Specifically, an aqueous NaCl solution is passed through the composite semipermeable membrane 12 of a predetermined size at a predetermined feed pressure. After the completion of a 30-minute preparation stage (the first time), the electrical conductivities of permeate water and feed water are measured using an electrical conductivity meter. Then, using the results of the measurement and a calibration curve (concentration vs. electrical conductivity), the NaCl rejection rate can be calculated as per the following equation. Instead of the electrical conductivity measurement, ion chromatography may be used to measure the concentration.

$$\text{NaCl rejection rate (\%)}=(1-(\text{NaCl concentration in permeate water}/\text{NaCl concentration in feed water}))\times 100$$

The composite semipermeable membrane 12 is typically a reverse osmosis membrane (RO membrane). It is to be noted, however, that the composite semipermeable membrane 12 may be a nanofiltration membrane (NF membrane).

The term "NF membrane" as used in the present specification means a composite semipermeable membrane that exhibits a NaCl rejection rate of 5% or more and less than 93% when an aqueous NaCl solution with a concentration of 2000 mg/liter is filtered therethrough at a feed pressure of 1.55 MPa and 25° C. The term "RO membrane" as used in the present specification means a composite semipermeable membrane that exhibits a NaCl rejection rate of 93% or more when an aqueous NaCl solution with a concentration of 2000 mg/liter is filtered therethrough at a feed pressure of 1.55 MPa and 25° C.

The composite semipermeable membrane 12 can be produced in the following manner.

First, the porous support membrane 12*a* serving as a support is prepared. There is no particular limitation on the porous support membrane 12*a* as long as the skin layer 12*b* can be formed on a surface thereof. The porous support membrane 12*a* may be an ultrafiltration membrane obtained by forming a microporous layer having an average pore diameter of 0.01 to 0.4 μm on a nonwoven fabric. Examples of the material forming the microporous layer include polyarylethersulfones such as polysulfone and polyethersulfone, polyimide, polyvinylidene fluoride, and polyetherimide. Polysulfone or polyarylethersulfone can be used as the material from the viewpoint of chemical stability, mechanical stability, and thermal stability. A self-supporting porous support membrane made of a thermosetting resin such as epoxy resin and having an average pore diameter as specified above can also be used. The thickness of the porous support membrane 12*a* is not limited to particular values. The thickness is, for example, in the range from 10 to 200 μm, and may be in the range from 20 to 75 μm.

In the present specification, the "average pore diameter" refers to a value calculated in the following manner. First, a surface or a cross-section of a membrane or a layer is observed with an electron microscope (e.g., a scanning electron microscope), and the diameters of a plurality of pores (e.g., ten randomly selected pores) observed are determined by actual measurement. The average value of the actually measured diameters of the pores is defined as the "average pore diameter". The "diameter of a pore" refers to the longest diameter of the pore, and specifically refers to the diameter of the smallest circle that can enclose the pore.

Next, a first solution containing a raw material of the skin layer 12*b* is brought into contact with the porous support membrane 12*a*. The first solution is typically an aqueous solution containing a polyfunctional amine as a raw material of the skin layer 12*b* (this solution is hereinafter referred to as "aqueous amine solution"). The aqueous amine solution is brought into contact with the porous support membrane 12*a*, whereby an amine-containing layer is formed on a surface of the porous support membrane 12*a*. The aqueous amine solution may contain a polar solvent other than water, such as an alcohol, in addition to water. Alternatively, a polar solvent other than water, such as an alcohol, may be used instead of water.

The polyfunctional amine is an amine having a plurality of reactive amino groups. The polyfunctional amine may be an aromatic polyfunctional amine, an aliphatic polyfunctional amine, or an alicyclic polyfunctional amine.

Examples of the aromatic polyfunctional amine include m-phenylenediamine, p-phenylenediamine, o-phenylenediamine, 1,3,5-triaminobenzene, 1,2,4-triaminobenzene, 3,5-diaminobenzoic acid, 2,4-diaminotoluene, 2,6-diaminotoluene, N,N'-dimethyl-m-phenylenediamine, 2,4-diaminoanisole, amidol, and xylylenediamine.

Examples of the aliphatic polyfunctional amine include ethylenediamine, propylenediamine, tris(2-aminoethyl) amine, and N-phenyl-ethylenediamine.

Examples of the alicyclic polyfunctional amine include 1,3-diaminocyclohexane, 1,2-diaminocyclohexane, 1,4-diaminocyclohexane, piperazine, and piperazine derivatives.

One polyfunctional amine selected from these polyfunctional amines may be used alone, or two or more polyfunctional amines selected from these polyfunctional amines may be used in combination.

In order to facilitate the formation of the amine-containing layer and improve the performance of the skin layer 12*b*, a polymer such as polyvinyl alcohol, polyvinylpyrrolidone, and polyacrylic acid or a polyhydric alcohol such as sorbitol and glycerin may be added to the aqueous amine solution.

The concentration of the amine component in the aqueous amine solution may be in the range from 0.1 to 15 mass % or in the range from 1 to 10 mass %. By adjusting the concentration of the amine component to fall within a suitable range, the occurrence of defects such as pinholes in the skin layer 12*b* can be reduced. Besides, it also allows the formation of the skin layer 12*b* having high salt rejection performance. Moreover, by adjusting the concentration of the amine component to fall within a suitable range, the thickness of the skin layer 12*b* is also adjusted to be in a suitable range, whereby the composite semipermeable membrane 12 capable of achieving a sufficient permeate flux is obtained.

The method for bringing the aqueous amine solution into contact with the porous support membrane 12*a* is not limited to particular methods. For example, the following methods can be employed as appropriate: immersing the porous support membrane 12*a* in the aqueous amine solution, applying the aqueous amine solution to the porous support membrane 12*a*, or spraying the aqueous amine solution onto the porous support membrane 12*a*. The step of bringing the aqueous amine solution into contact with the porous support membrane 12*a* may be followed by the step of removing the excess of the aqueous amine solution from the porous support membrane 12*a*. For example, the excess of the aqueous amine solution can be removed from the porous support membrane 12*a* by spreading the amine-containing layer with a rubber roller. By removing the excess of the aqueous amine solution, the skin layer 12*b* having a suitable thickness can be formed.

Next, a second solution is brought into contact with the amine-containing layer. The second solution is a solution containing another raw material of the skin layer 12*b*. Specifically, the second solution is a solution containing a polyfunctional acid halide as another raw material of the skin layer 12*b* (this solution is hereinafter referred to as "acid halide solution"). Upon contact of the acid halide solution with the amine-containing layer, a polymerization reaction between the amine and the acid halide proceeds at the interface between the amine-containing layer and a layer of the acid halide solution. As a result, the skin layer 12*b* is formed.

The polyfunctional acid halide is an acid halide having a plurality of reactive carbonyl groups. Examples of the polyfunctional acid halide include aromatic polyfunctional acid halides, aliphatic polyfunctional acid halides, and alicyclic polyfunctional acid halides.

Examples of the aromatic polyfunctional acid halides include trimesic acid trichloride, terephthalic acid dichloride, isophthalic acid dichloride, biphenyldicarboxylic acid dichloride, naphthalenedicarboxylic acid dichloride, benzenetrisulfonic acid trichloride, benzenedisulfonic acid dichloride, and chlorosulfonyl benzenedicarboxylic acid dichloride.

Examples of the aliphatic polyfunctional acid halides include propanedicarboxylic acid dichloride, butanedicarboxylic acid dichloride, pentanedicarboxylic acid dichloride, propanetricarboxylic acid trichloride, butanetricarboxylic acid trichloride, pentanetricarboxylic acid trichloride, glutaryl halide, and adipoyl halide.

Examples of the alicyclic polyfunctional acid halides include cyclopropanetricarboxylic acid trichloride, cyclobutanetetracarboxylic acid tetrachloride, cyclopentanetricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, and tetrahydrofurandicarboxylic acid dichloride.

One polyfunctional acid halide selected from these polyfunctional acid halides may be used alone, or two or more polyfunctional acid halides selected from these polyfunctional acid halides may be used in combination. An aromatic polyfunctional acid halide may be used in order to obtain the skin layer 12*b* having high salt rejection performance. A trivalent or higher-valent polyfunctional acid halide may be used as at least part of the polyfunctional acid halide component to form a cross-linked structure.

The solvent used in the acid halide solution may be an organic solvent, and in particular, may be a non-polar organic solvent. The organic solvent is not limited to particular types of organic solvent as long as it has low solubility in water, does not deteriorate the porous support membrane 12*a*, and can dissolve the polyfunctional acid halide component. Examples of the organic solvent include saturated hydrocarbons such as cyclohexane, heptane, octane, and nonane and halogen-substituted hydrocarbons such as 1,1,2-trichlorotrifluoroethane. A saturated hydrocarbon having a boiling point of 300° C. or lower or a boiling point of 200° C. or lower may be used.

The concentration of the acid halide component in the acid halide solution may be in the range from 0.01 to 5 mass % or in the range from 0.05 to 3 mass %. By adjusting the concentration of the acid halide component to fall within a suitable range, the amounts of the amine component and halide component that remain unreacted can be reduced. Besides, the occurrence of defects such as pinholes in the skin layer 12*b* can be reduced, whereby the composite semipermeable membrane 12 having high salt rejection performance can be provided. Moreover, by adjusting the concentration of the acid halide component to fall within a suitable range, the thickness of the skin layer 12*b* is also adjusted to be in a suitable range, whereby the composite semipermeable membrane 12 capable of achieving a sufficient permeate flux can be provided.

The method for bringing the acid halide solution into contact with the amine-containing layer is not limited to particular methods. The amine-containing layer may be immersed in the acid halide solution together with the porous support membrane 12*a*, or the acid halide solution may be applied to the surface of the amine-containing layer. The contact time between the amine-containing layer and the acid halide solution is, for example, from 10 seconds to 5 minutes or from 30 seconds to 1 minute. The step of bringing the acid halide solution into contact with the amine-containing layer may be followed by the step of removing the excess of the acid halide solution from the amine-containing layer.

Next, the skin layer 12*b* is dried by heating the skin layer 12*b* together with the porous support membrane 12*a*. The heat treatment of the skin layer 12*b* can improve the mechanical strength, the heat resistance, and the like of the skin layer 12*b*. The heating temperature is, for example, from 70° C. to 200° C. or from 80° C. to 130° C. The heating time is, for example, from 30 seconds to 10 minutes or from 40 seconds to 7 minutes. Alternatively, a drying step may be performed at room temperature, and then another drying step may be further performed using a dryer at an ambient temperature higher than room temperature.

Various additives may be added to the aqueous amine solution and/or the acid halide solution in order to facilitate the formation of the skin layer 12*b* or improve the performance of the composite semipermeable membrane 12 to be obtained. Examples of the additives include: surfactants such as sodium dodecylbenzenesulfonate, sodium dodecyl sulfate, and sodium lauryl sulfate; basic compounds effective in removing hydrogen halides generated through the polymerization, such as sodium hydroxide, trisodium phosphate, and triethylamine; acylation catalyst; and compounds having a solubility parameter from 8 to 14 $(cal/cm^3)^{1/2}$.

By performing the above-described steps, a membrane having the porous support membrane 12*a* and the skin layer 12*b* is obtained. The thickness of the skin layer 12*b* is not limited to particular values, and is, for example, from 0.05 to 2 μm and may be from 0.1 to 1 μm.

The present specification describes a method for forming the skin layer 12*b* directly on a surface of the porous support membrane 12*a* through interfacial polymerization. It is to be noted that the skin layer 12*b* may be formed on a support other than the porous support membrane 12*a*, and thereafter, the skin layer 12*b* obtained may be placed on and joined to the porous support membrane 12*a*. In other words, the skin layer 12*b* may be transferred onto the porous support membrane 12*a* from another support.

Next, the coating 12*c* is formed. The coating 12*c* can be formed by bringing an aqueous solution containing the above-described polymer into contact with the skin layer 12*b* to form a polymer-containing layer and then drying the polymer-containing layer. The method for bringing the aqueous solution into contact with the skin layer 12*b* is not limited to particular methods. The skin layer 12*b* may be immersed in the aqueous solution together with the porous support membrane 12*a*, or the aqueous solution may be applied to the surface of the skin layer 12*b*. The contact time between the skin layer 12*b* and the aqueous solution is, for example, from 10 seconds to 5 minutes. The step of bringing the aqueous solution into contact with the skin layer 12*b* may be followed by the step of removing the excess of the aqueous solution from the skin layer 12*b*. The aqueous solution may contain a polar solvent other than water, such as an alcohol, in addition to water. Alternatively, a polar solvent other than water, such as an alcohol, may be used instead of water.

Subsequently, the polymer-containing layer is dried by heating. The heat treatment of the polymer-containing layer can improve the mechanical strength, the heat resistance, and the like of the coating 12*c*. The heating temperature is, for example, from 80° C. to 150° C. The heating time is, for example, from 10 to 300 seconds. Alternatively, a drying step may be performed at room temperature, and then another drying step may be further performed using a dryer at an ambient temperature higher than room temperature.

By performing the above-described steps, the composite semipermeable membrane 12 having the porous support membrane 12*a*, the skin layer 12*b*, and the coating 12*c* is obtained.

Embodiment 2

Figure 4:
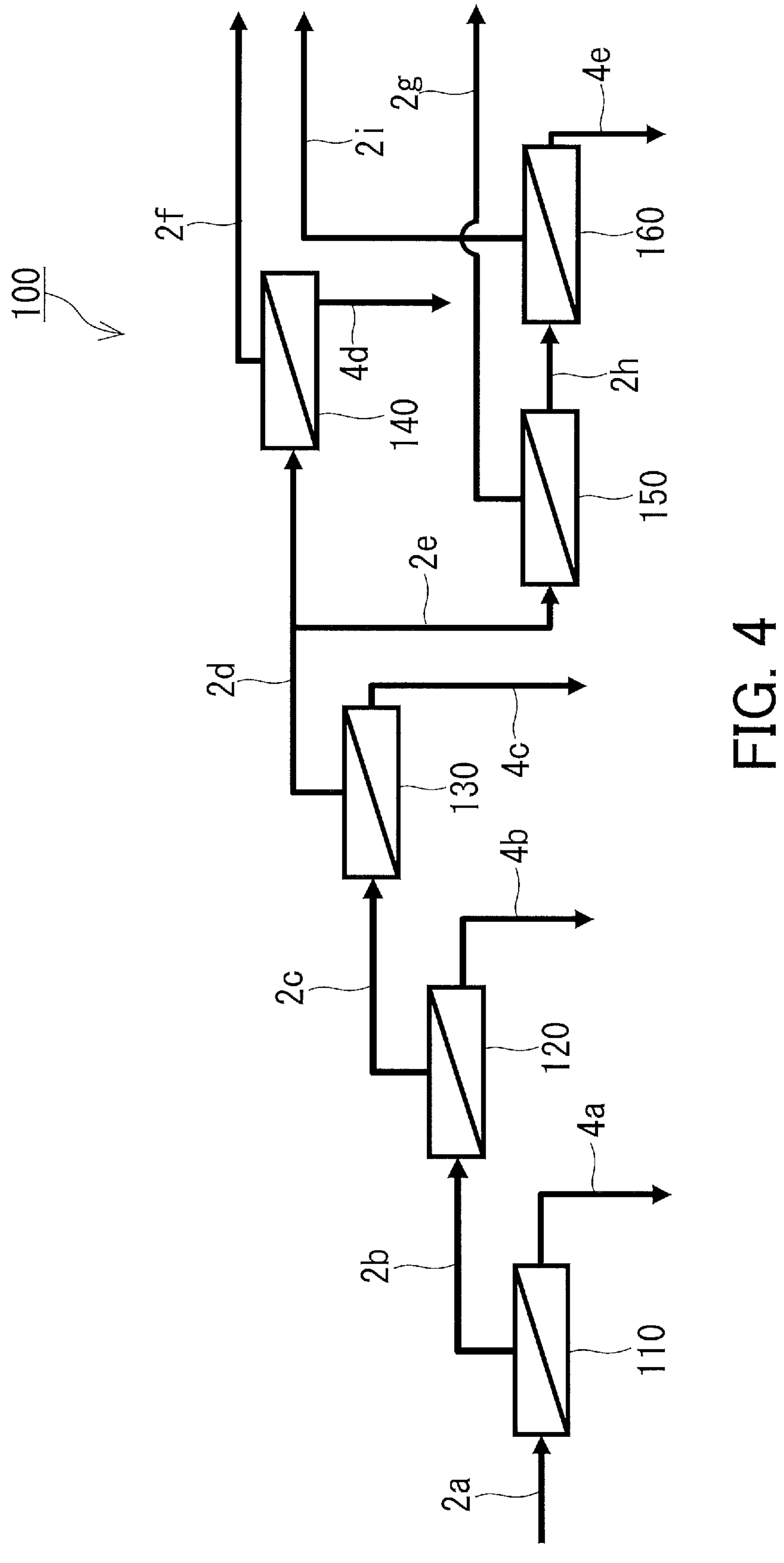
FIG. 4 is a configuration diagram showing a water treatment system according to Embodiment 2.

FIG. 4 is a configuration diagram showing a water treatment system according to Embodiment 2. A water treatment system 100 includes a plurality of RO membrane modules. The RO membrane modules include a low-pressure RO membrane module 110, a medium-pressure RO membrane module 120, and a high-pressure RO membrane module 130. The low-pressure RO membrane module 110, the medium-pressure RO membrane module 120, and the high-pressure RO membrane module 130 are connected to each other such that wastewater is filtered by passing through these modules in this order.

At least one selected from the group consisting of the low-pressure RO membrane module 110, the medium-pressure RO membrane module 120, and the high-pressure RO membrane module 130 includes the spiral membrane element 20 described in Embodiment 1. The spiral membrane element 20 is superior in terms of durability against ON-OFF switching of water pressure application. Accordingly, even if ON and OFF states of the water treatment system 100 are repeatedly switched, the salt rejection performance of the module including the spiral membrane element 20 can be maintained over a long period of time.

More specifically, the medium-pressure RO membrane module 120 includes the spiral membrane element 20 described in Embodiment 1. Since the feed pressure to the low-pressure RO membrane module 110 is low, composite semipermeable membranes used in the low-pressure RO membrane module 110 are unlikely to be damaged even if they are repeatedly subjected to ON-OFF switching of water pressure application. In the high-pressure RO membrane module 130, permeate-side flow path materials having a dense knitting density can be used. Regarding the medium-pressure RO membrane module 120, it is difficult to achieve a good balance between the configuration thereof and the feed pressure thereto. Thus, by using the spiral membrane element 20 of Embodiment 1 in the medium-pressure RO membrane module 120, the salt rejection performance of the medium-pressure RO membrane module 120 can be maintained over a long period of time.

The spiral membrane element may also be used in each of the low-pressure RO membrane module 110 and the high-pressure RO membrane module 130.

The water treatment system 100 is, for example, a ZLD system. As described above, a ZLD system may involve frequent switching between running and stopping of the system. Accordingly, the water treatment system 100 of the present embodiment is particularly suitable for use as a ZLD system.

A flow path 2*a* is connected to an inlet of the low-pressure RO membrane module 110. A flow path 2*b* is concentrated to a concentrate water outlet of the low-pressure RO membrane module 110 and an inlet of the medium-pressure RO membrane module 120. A flow path 2*c* is concentrated to a concentrate water outlet of the medium-pressure RO membrane module 120 and an inlet of the high-pressure RO membrane module 130.

The low-pressure RO membrane module 110 includes at least one low-pressure RO membrane element housed in a pressure resistant vessel. The low-pressure RO membrane module 110 may include a plurality of low-pressure RO membrane elements or only one low-pressure RO membrane element.

The medium-pressure RO membrane module 120 includes at least one medium-pressure RO membrane element housed in a pressure resistant vessel. The medium-pressure RO membrane module 120 may include a plurality of medium-pressure RO membrane elements or only one medium-pressure RO membrane element.

The high-pressure RO membrane module 130 includes at least one high-pressure RO membrane element housed in a pressure resistant vessel. The high-pressure RO membrane module 130 may include a plurality of high-pressure RO membrane elements or only one high-pressure RO membrane element.

The feed pressure to the low-pressure RO membrane module 110 is, for example, 0.5 MPa or more and 2.0 MPa or less. The feed pressure to the medium-pressure RO membrane module 120 is, for example, 2.0 MPa or more and 4.0 MPa or less. The feed pressure to the high-pressure RO membrane module 130 is, for example, more than 4.0 MPa and 8.0 MPa or less. That is, the feed pressure to the low-pressure RO membrane module 110 is lower than the feed pressure to the medium-pressure RO membrane module 120. The feed pressure to the medium-pressure RO membrane module 120 is lower than the feed pressure to the high-pressure RO membrane module 130. By adjusting the feed pressures to the respective RO membrane modules to fall within suitable ranges and also by using the spiral membrane element 20 of Embodiment 1 in the medium-pressure RO membrane module 120, it becomes possible to construct the water treatment system 100 with excellent durability against ON-OFF switching of water pressure application.

The low-pressure RO membrane module 110, the medium-pressure RO membrane module 120, and the high-pressure RO membrane module 130 each include a permeate-side flow path material, which is a tricot knitted material. The permeate-side flow path material used in the low-pressure RO membrane module 110 has a lower knitting density than the permeate-side flow path material used in the medium-pressure RO membrane module 120. The permeate-side flow path material used in the medium-pressure RO membrane module 120 has a lower knitting density than the permeate-side flow path material used in the high-pressure RO membrane module 130. Such a configuration allows the composite semipermeable membranes in the respective modules to be unlikely to be damaged even when running and stopping of the water treatment system 100 is repeated, while allowing each of the modules to ensure a suitable permeate flux.

To the low-pressure RO membrane module 110, wastewater that has been properly pretreated is introduced through the flow path 2*a*. The wastewater is concentrated in the low-pressure RO membrane module 110. Examples of the pretreatment include filtration of wastewater using sand such as silica sand and filtration of wastewater using an ultrafiltration membrane (UF membrane) or a microfiltration membrane (MF membrane). To the medium-pressure RO membrane module 120, the wastewater that has been concentrated in the low-pressure RO membrane module 110 is introduced through the flow path 2*b*. In the medium-pressure RO membrane module 120, the wastewater that has been concentrated in the low-pressure RO membrane module 110 is further concentrated. To the high-pressure RO membrane module 130, the wastewater that has been concentrated in the medium-pressure RO membrane module 120 is introduced through the flow path 2*c*. In the high-pressure RO membrane module 130, the wastewater that has been concentrated in the medium-pressure RO membrane module 120 is further concentrated.

Flow paths 4*a*, 4*b*, and 4*c* are connected to a permeate water outlet of the low-pressure RO membrane module 110, a permeate water outlet of the medium-pressure RO membrane module 120, and a permeate water outlet of the high-pressure RO membrane module 130, respectively. Through the flow paths 4*a*, 4*b*, and 4*c*, the permeate water is supplied to a plant or the like for reuse.

The water treatment system 100 further includes an ultra-high-pressure RO membrane module 140, a NF membrane module 150, and an ultra-high-pressure RO membrane module 160. The ultra-high-pressure RO membrane modules 140 and 160 are operated at feed pressures that are higher than the feed pressure to the high-pressure RO membrane module 130. A flow path 2*d* is connected to a concentrate water outlet of the high-pressure RO membrane module 130 and an inlet of the ultra-high-pressure RO membrane module 140. A flow path 2*e* is connected to the concentrate water outlet of the high-pressure RO membrane module 130 and an inlet of the NF membrane module 150. A flow path 2*f* is connected to a concentrate water outlet of the ultra-high-pressure RO membrane module 140. A flow path 2*g* is connected to a concentrate water outlet of the NF membrane module 150. A flow path 2*h* is connected to a permeate water outlet of the NF membrane module 150 and an inlet of the ultra-high-pressure RO membrane module 160.

To the ultra-high-pressure RO membrane module 140, the wastewater that has been concentrated in the high-pressure RO membrane module 130 is introduced through the flow path 2*d*. In the ultra-high-pressure RO membrane module 140, the wastewater that has been concentrated in the high-pressure RO membrane module 130 is further concentrated. To the NF membrane module 150, the wastewater that has been concentrated in the high-pressure RO membrane module 130 is introduced through the flow path 2*e*. The NF membrane module selectively removes divalent ions from the wastewater that has been concentrated in the high-pressure RO membrane module 130. To the ultra-high-pressure RO membrane module 160, the permeate water from the NF membrane module 150 is introduced through the flow path 2*h*. The permeate water that has been filtered through the NF membrane module 150 is further filtered through the ultra-high-pressure RO membrane module 160.

Flow paths 4*d* and 4*e* are connected to a permeate water outlet of the ultra-high-pressure RO membrane module 140 and a permeate water outlet of the ultra-high-pressure RO membrane module 160, respectively. Through the flow paths 4*d* and 4*e*, the permeate water is supplied to a plant or the like for reuse. The concentrate water is supplied through the flow paths 2*f*, 2*i*, and 2*g* to components used for post-treatments, such an electrolyzer and an evaporator.

Each flow path of the water treatment system 100 is provided with a pump, a valve, a sensor, or the like, as necessary.

The term "feed pressure" refers to a pressure applied to raw water in the vicinity of an inlet of a module. The vicinity of an inlet of a module refers to, for example, a space between an element located on the furthest upstream in the module and a flow path.

EXAMPLES

Production Example 1: Production Example of Composite Semipermeable Membrane 3.0 mass % of m-phenylenediamine, 0.15 mass % of sodium dodecyl sulfate, 2.15 mass % of triethylamine, 0.31 mass % of sodium hydroxide, 6 mass % of camphorsulfonic acid, and 1 mass % of isopropyl alcohol were mixed together to prepare an aqueous amine solution. The aqueous amine solution was applied to a polysulfone porous support membrane formed on a polyester nonwoven fabric. Thereafter, the excess of the aqueous amine solution was removed. Thus, an amine-containing layer was formed. On the other hand, an acid chloride solution was prepared by dissolving 0.20 mass % of trimesic acid trichloride in a naphthenic solvent (Exxon Mobil Corporation, Exxsol D40). The surface of the amine-containing layer was immersed in the acid chloride solution for 7 seconds. Thereafter, the excess of the acid chloride solution was removed. As a result, an interfacial polymerization reaction was caused to proceed, whereby a skin layer was formed. The skin layer was air-dried for 20 seconds and then further heated for 3 minutes in a hot air dryer at 140° C. Through these steps, a composite semipermeable membrane including the nonwoven fabric substrate, the polysulfone porous support membrane, and the polyamide skin layer in this order was obtained.

An aqueous polyvinyl alcohol solution containing polyvinyl alcohol (PVA) (the degree of saponification: 99% or more, the viscosity of a 4 mass % solution: 62.0 to 72.0 mPa·s (25° C.)) at a concentration of 0.165 mass % was prepared. The surface of the composite semipermeable membrane was brought into contact with this aqueous polyvinyl alcohol solution for 10 seconds. Thereafter, the composite semipermeable membrane was air-dried for 30 seconds and then further heated for 2 minutes in a hot air dryer at 120° C. Thus, the composite semipermeable membrane provided with a PVA coating was obtained as a composite semipermeable membrane of Production Example 1.

(Calculation of Elastic Modulus of Membrane Surface by Force Curve Measurement with AFM in Water)

Figure 5:
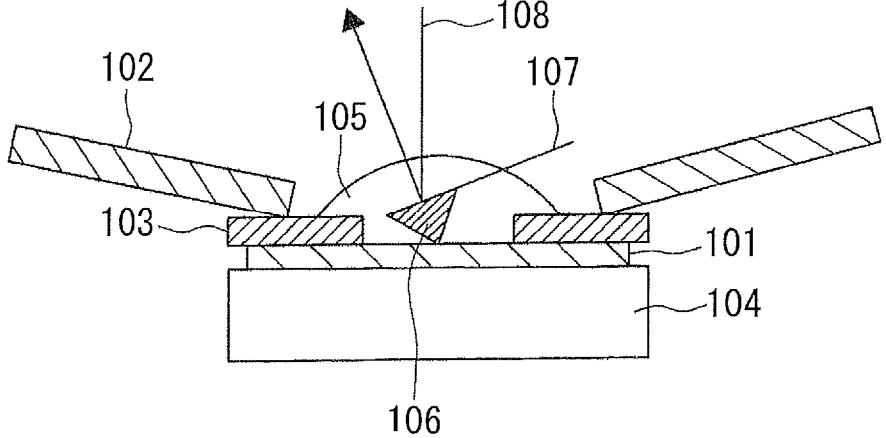
FIG. 5 illustrates a method for performing force curve measurement using AFM in water.

FIG. 5 illustrates a method for performing force curve measurement using AFM in water. The elastic modulus of the membrane surface of the composite semipermeable membrane of Production Example 1 were measured in the following manner. First, the composite semipermeable membrane of Production Example 1 was cut into a size of 2 cm×2 cm to obtain a test piece 101. Next, as shown in FIG. 5, the test piece 101 was fixed on a glass plate 104 of a fixture for liquid environment measurement (Closed Fluid Cell) manufactured by Asylum Technology using fixing pins 102 and presser plates 103. Thereafter, about 100 μL of ultrapure water 105 was added in the form of a drop onto the test piece 101.

The test piece 101 was moved vertically, and a spherical probe 106 was pressed into the surface of the test piece 101 while applying a load onto the surface. Thereafter, the spherical probe 106 was pulled away from the test piece 101. The deflection or warp (displacement) of a cantilever 107 caused when the spherical probe 106 was pulled away from the test piece 101 was detected by a photodiode by detecting the displacement of a laser beam 108. Thus, a force curve was measured. The force curve was converted to the load and to the amount of deformation on the membrane surface using a program supplied with a measurement device. The force curve measurement was performed in a region with a measurement area of 5 μm×5 μm and at five randomly selected points. The elastic modulus was then calculated through fitting into a Heltz model using analysis software supplied with the measurement device.

Measurement device: MFP-3D-SA (Asylum Technology)

Cantilever: spring constant=40 N/m.

Spherical probe: manufactured by NanoWorld AG, radius of curvature of tip thereof=0.4 μm, Silicon (100), Poisson's ratio=0.17, Elastic modulus=150 GPa Measurement environment: in ultrapure water (from 28° C. to 30° C.)

Speeds at which the probe was pressed into and pulled away: 1 Hz

The number n of measurements: 5

The elastic modulus $E_{sample}$ (MPa) of the membrane surface of the composite semipermeable membrane of Production Example 1 was determined by substituting the respective numerical values into the following Hertzian elastic contact theoretical formula using software supplied with the measurement device. As a result, the elastic modulus was determined to be 340 MPa.

(Hertzian Elastic Contact Theoretical Formula)

$$h = \left[3/4\left[\left\{\left(1 - v_{probe}^2\right)/E_{probe}\right\} + \left\{\left(1 - v_{sample}^2\right)/E_{sample}\right\}\right]\right]^{2/3} F^{2/3} r^{-1/3}$$

h: The amount of deformation of the membrane surface (average value)

$v_{probe}$: The Poisson's ratio of the probe=0.17

$v_{sample}$: The Poisson's ratio of the test piece=0.33 (0.33 was employed as a representative value of the resin (fixed value))

$E_{probe}$: The elastic modulus of the probe=150 GPa $E_{sample}$: The elastic modulus (MPa) of the test piece F: Optional r: The radius of curvature of the tip of the probe=10 nm

Production Example 2: Production Example of Composite Semipermeable Membrane

A composite semipermeable membrane of Production Example 2 was produced in the same manner as in Production Example 1, except that betaine polymer (Osaka Organic Chemical Industry Ltd., LAMBIC-1100W) was used instead of PVA.

Production Example 3: Production Example of Composite Semipermeable Membrane

A composite semipermeable membrane of Production Example 3 was produced in the same manner as in Production Example 1, except that PEOX (poly(2-ethyl-2-oxazoline)) was used instead of PVA.

Production Example 4: Production Example of Composite Semipermeable Membrane

A composite semipermeable membrane of Production Example 4 was produced in the same manner as in Example 1, except that the composite semipermeable membrane was not coated with PVA.

[ON-OFF Test]

A composite semipermeable membrane and a permeate-side flow path material were placed in a pressure resistant container, and the initial NaCl rejection rate was measured in the above-described manner. Then, the step of continuously supplying pressurized RO water (25° C.) for 90 seconds and the step of stopping the supply of the RO water were repeated to a total of 7000 times. After repeating these steps to a total of 7000 times, the NaCl rejection rate was measured.

(Samples 1 to 4)

The ON-OFF test was performed using the composite semipermeable membrane obtained in Production Example 1 and each of the permeate-side flow path materials and feed pressures shown in Table 1 for Samples 1 to 4 in combination. The results obtained are shown in Table 1. The permeate-side flow path material was laminated on the composite semipermeable membrane in such a manner that a surface with protrusions of wales (rough surface) was in contact with the surface of the polyester nonwoven fabric included in the composite semipermeable membrane.

(Sample 5)

The ON-OFF test was performed using the composite semipermeable membrane obtained in Production Example 2 and the permeate-side flow path material and feed pressure shown in Table 1 for Sample 5 in combination. The results obtained are shown in Table 1.

(Sample 6)

The ON-OFF test was performed using the composite semipermeable membrane obtained in Production Example 3 and the permeate-side flow path material and feed pressure shown in Table 1 for Sample 6 in combination. The results obtained are shown in Table 1.

(Samples 7 and 8)

The ON-OFF test was performed using the composite semipermeable membranes obtained in Production Example 4 and each of the permeate-side flow path materials and feed pressures shown in Table 1 for Samples 7 and 8 in combination. The results obtained are shown in Table 1.

(Sample 9)

The ON-OFF test was performed using the composite semipermeable membrane obtained in Production Example 1 and the permeate-side flow path material and feed pressure shown in Table 1 for Sample 9 in combination. The results obtained are shown in Table 1.

TABLE 1

| | Elastic Modulus (MPa) | Coating Material | Permeate-Side Flow Path Material | Feed Pressure (MPa) | Difference in Salt Rejection Rate Before and After ON-OFF Test (%) |
|---|---|---|---|---|---|
| Sample 1 | 340 | PVA | 33 wales<br>38 corses | 2.0 | Before: 99.75<br>After: 99.35<br>Difference: −0.40 |
| Sample 2 | 340 | PVA | 33 wales<br>38 corses | 4.0 | Before: 99.76<br>After: 96.86<br>Difference: −2.90 |
| Sample 3 | 340 | PVA | 57 wales<br>49 corses | 2.0 | Before: 99.77<br>After: 99.76<br>Difference: −0.01 |

TABLE 1-continued

| | Elastic Modulus (MPa) | Coating Material | Permeate-Side Flow Path Material | Feed Pressure (MPa) | Difference in Salt Rejection Rate Before and After ON-OFF Test (%) |
|---|---|---|---|---|---|
| Sample 4 | 340 | PVA | 57 wales<br>49 corses | 4.0 | Before: 99.80<br>After: 99.45<br>Difference: −0.35 |
| Sample 5 | 260 | Betaine polymer | 33 wales<br>38 corses | 2.0 | Before: 99.76<br>After: 99.33<br>Difference: −0.43 |
| Sample 6 | 480 | PEOX | 33 wales<br>38 corses | 2.0 | Before: 99.77<br>After: 99.30<br>Difference: −0.47 |
| Sample 7 | 756 | — | 33 wales<br>38 corses | 2.0 | Before: 99.69<br>After: 99.06<br>Difference: −0.63 |
| Sample 8 | 756 | — | 33 wales<br>38 corses | 4.0 | Before: 99.70<br>After: 94.23<br>Difference: −5.47 |
| Sample 9 | 340 | PVA | 57 wales<br>49 corses | 5.0 | Before: 99.78<br>After: 98.75<br>Difference: −1.03 |

As can be seen from the results obtained regarding Samples 1 and 7, the difference in salt rejection rate before and after the ON-OFF test in the case of the combination of Sample 1 was smaller than the difference in salt rejection rate before and after the ON-OFF test in the case of the combination of Sample 7. That is, the combination of Sample 1 was superior in terms of durability against ON-OFF switching of water pressure application. Accordingly, it is considered that the combination of Sample 1 is suitable for a system that involves frequently repeated switching between ON and OFF states, such as a ZLD system.

As can be seen from the results obtained regarding Samples 1 and 2, increasing the feed pressure resulted in a higher degree of decrease in salt rejection rate. It is to be noted, however, that, as can be seen from the results obtained regarding Samples 2 and 8, the difference in salt rejection rate before and after the ON-OFF test in the case of the combination of Sample 2 was smaller than the difference in salt rejection rate before and after the ON-OFF test in the case of the combination of Sample 8. That is, the combination of Sample 2 was superior in terms of durability against ON-OFF switching of water pressure application. Accordingly, it is considered that the combination of Sample 2 is suitable for a system that involves frequently repeated switching between ON and OFF states, such as a ZLD system.

As can be seen from the results obtained regarding Samples 3 and 4, increasing the knitting density of the permeate-side flow path material improved the durability against ON-OFF switching of water pressure application. In particular, as can be seen from the result obtained regarding Sample 4, even when a relatively high feed pressure (4.0 MPa) was used in the ON-OFF test, the degree of decrease in salt rejection rate caused by the ON-OFF test could be greatly reduced by using the permeate-side flow path material having a suitable knitting density. This indicates that the effect brought about by the composite semipermeable membrane and the effect brought about by the permeate-side flow path material produced a synergistic effect. It is considered that the combination of Sample 3 and the combination of Sample 4 are suitable for a system that involves frequently repeated switching between ON and OFF states, such as a ZLD system.

The results obtained regarding Samples 5 and 6 suggest that good results can be obtained regardless of the type of coating material.

In Sample 9, since the feed pressure was too high, the salt rejection rate decreased greatly after the ON-OFF test.

[Observation of Membrane Surface After ON-OFF Test]

After the ON-OFF test, the membrane surface of each of the composite semipermeable membranes of Samples 1, 3, and 7 was observed. Specifically, a staining solution with a concentration of 160 mg/L was prepared using a dye (Tokyo Chemical Industry Co., Ltd., Basic Violet 1). The staining solution pressurized at 1.5 MPa was passed through the composite semipermeable membrane for 10 minutes. After passing the staining solution through the composite semipermeable membrane, the composite semipermeable membrane was washed with RO water and dried at room temperature. Thereafter, the membrane surface was observed using a digital microscope (KEYENCE CORPORATION, VHX 6000) at 50× magnification. The results are shown in FIGS. 6A, 6B, and 6C.

Figure 6A:
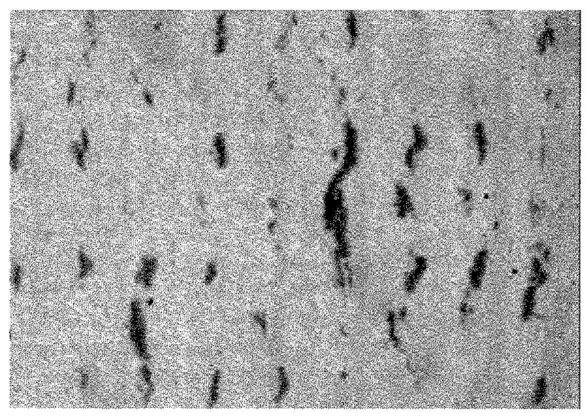
FIG. 6A is an optical microscope image of a composite semipermeable membrane of Sample 1 after being stained.
Figure 6B:
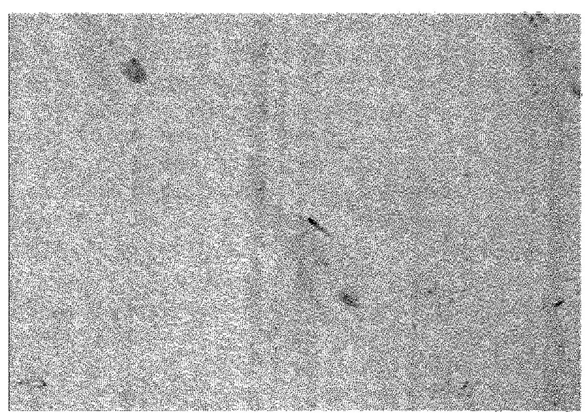
FIG. 6B is an optical microscope image of a composite semipermeable membrane of Sample 3 after being stained.
Figure 6C:
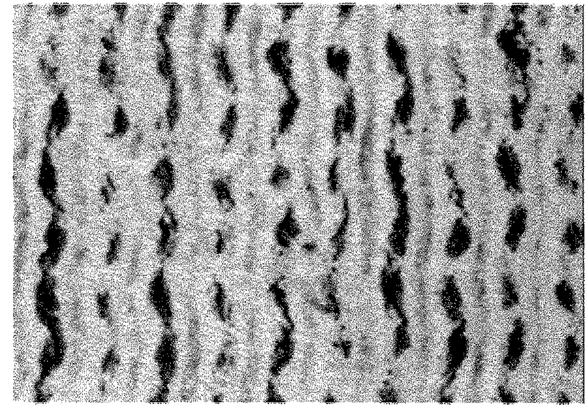
FIG. 6C is an optical microscope image of a composite semipermeable membrane of Sample 7 after being stained.

FIG. 6A is an optical microscope image of the composite semipermeable membrane of Sample 1 after being stained. FIG. 6B shows the same regarding Sample 3. FIG. 6C shows the same regarding Sample 7. In FIGS. 6A, 6B, and 6C, portions that appear dark are portions where defects were caused and thus the dye was allowed to soak. Portions that appear bright are portions with few defects and thus with little soaking of the dye.

As can be seen from FIG. 6A, only a small number of defects were observed in the composite semipermeable membrane of Sample 1. Minor defects were caused in parallel with the wale direction. As can be seen from FIG. 6B, there were few defects in the composite semipermeable membrane of Sample 3. As can be seen from FIG. 6C, notable defects were caused along the wale direction in the composite semipermeable membrane of Sample 7.

The present invention is useful for wastewater treatment systems such as a ZLD system.

What is claimed is:

1. A zero liquid discharge water treatment system comprising a spiral membrane element, wherein the spiral membrane element comprises a composite semipermeable membrane, the composite semipermeable membrane comprises a porous support membrane, a skin layer supported by the porous support membrane, and a coating that covers the skin layer, the skin layer comprises polyamide, the coating comprises a polymer that comprises at least one selected from the group consisting of betaine polymer and polyoxazoline, a membrane surface of the composite semipermeable membrane has an elastic modulus of 250 MPa or more and 500 MPa or less as calculated by force curve measurement using AFM in water, and the elastic modulus is a value calculated from a force curve measured by the AFM in water at the position where ultrapure water is dropped on a surface of the coating of the composite semipermeable membrane.

2. The zero liquid discharge water treatment system according to claim 1, wherein the spiral membrane element further comprises a permeate-side flow path material that comprises a tricot knitted material having a knitting density of 31 to 60 wales and 34 to 52 courses, and the composite semipermeable membrane is in contact with the permeate-side flow path material.

3. The zero liquid discharge water treatment system according to claim 1, further comprising:

a low-pressure RO membrane module;

a medium-pressure RO membrane module for further concentrating wastewater that has been concentrated in the low-pressure RO membrane module; and a high-pressure RO membrane module for further concentrating the wastewater that has been concentrated in the medium-pressure RO membrane module, wherein the medium-pressure RO membrane module comprises the spiral membrane element.

4. A water treatment method in a zero liquid discharge water treatment system according claim 1 that further comprises a low-pressure RO membrane module, a medium-pressure RO membrane module comprising the spiral membrane element, and a high-pressure RO membrane module, the method comprising:

concentrating wastewater in the low-pressure RO membrane module;

further concentrating, in the medium-pressure RO membrane module, the wastewater that has been concentrated in the low-pressure RO membrane module; and further concentrating, in the high-pressure RO membrane module, the wastewater that has been concentrated in the medium-pressure RO membrane module, wherein a feed pressure to the low-pressure RO membrane module is lower than a feed pressure to the medium-pressure RO membrane module, the feed pressure to the medium-pressure RO membrane module is lower than a feed pressure to the high-pressure RO membrane module, and the feed pressure to the medium-pressure RO membrane module is 2.0 MPa or more and 4.0 MPa or less.

5. The zero liquid discharge water treatment system according to claim 1, wherein the elastic modulus is 260 MPa or more and 480 MPa or less.

* * * * *